(12) United States Patent
Murnen et al.

(10) Patent No.: US 7,597,337 B2
(45) Date of Patent: Oct. 6, 2009

(54) SYSTEM AND METHOD FOR PROVIDING GYROSCOPIC STABILIZATION TO A TWO-WHEELED VEHICLE

(75) Inventors: Hannah Murnen, LaGrange, IL (US); Augusta Niles, Norwich, VT (US); Nathan Sigworth, Hamden, CT (US); Deborah Sperling, Lincoln, MA (US)

(73) Assignee: Gyro-Precession Stability Systems, LLC, Manchester, NH (US)

( * ) Notice: Subject to any disclaimer, the term of this patent is extended or adjusted under 35 U.S.C. 154(b) by 0 days.

(21) Appl. No.: 11/967,491

(22) Filed: Dec. 31, 2007

(65) Prior Publication Data

US 2008/0100031 A1 May 1, 2008

Related U.S. Application Data

(62) Division of application No. 11/170,993, filed on Jun. 30, 2005, now Pat. No. 7,314,225.

(51) Int. Cl.
*B62M 1/10* (2006.01)
(52) U.S. Cl. ........................... 280/217; 280/293
(58) Field of Classification Search ............... 280/212, 280/215, 217, 293
See application file for complete search history.

(56) References Cited

U.S. PATENT DOCUMENTS

| | | | |
|---|---|---|---|
| 2,141,233 A | 12/1938 | Alexander | |
| 3,511,454 A * | 5/1970 | Hamilton | 244/79 |
| 3,787,066 A | 1/1974 | Hautier | |
| 4,272,094 A | 6/1981 | Patrin | |
| 4,353,569 A | 10/1982 | Molina | |
| 4,363,186 A * | 12/1982 | Goldfarb et al. | 446/429 |
| 4,463,515 A | 8/1984 | Barlow et al. | |
| 4,712,806 A | 12/1987 | Patrin | |
| 5,338,204 A | 8/1994 | Herndon | |
| 5,395,130 A | 3/1995 | Rubin | |
| 5,791,675 A | 8/1998 | Fleischer | |

(Continued)

FOREIGN PATENT DOCUMENTS

WO    WO 2004026649 A1 *   4/2004

(Continued)

*Primary Examiner*—Kevin Hurley
(74) *Attorney, Agent, or Firm*—William A. Loginov; Loginov & Associates, PLLC

(57) ABSTRACT

This invention provides a stabilizing system and method for two-wheeled vehicles (typically small, human-powered bicycles) that affords the rider no restriction on the full range of movements (banks, leans, etc.) common to bicycles, but that provides greater stability during turns and other maneuvers so that an unintentional bank or tilt (potentially causing a fall) is less likely, even at relatively slow speeds and startup. A rotating mass of predetermined mass-value and radial mass-distribution is provided coaxially with the front axle. The mass is supported on bearings so as to freewheel with respect to the rotation of the front wheel. As such it can be induced to spin significantly faster than the front wheel thereby generating a gyroscopic effect at the front wheel about the axle. This gyroscopic effect influences the steering of the wheel by the rider. Due to precession, the wheel tends to follow any excessive bank by the bicycle, ensuring that the rider can "steer-out-of" an unintended tilt or bank. Likewise, the gyroscopic effect limits the rider's ability to execute excessive steering, thereby preventing jackknife movements.

9 Claims, 10 Drawing Sheets

U.S. PATENT DOCUMENTS

| | | |
|---|---|---|
| 5,915,711 A | 6/1999 | Seiple |
| 5,960,900 A * | 10/1999 | Cheng .................. 180/165 |
| 5,988,663 A | 11/1999 | Starks |
| 6,095,891 A * | 8/2000 | Hoeting et al. ............. 446/440 |
| 6,113,122 A | 9/2000 | Plana |
| 6,175,172 B1 * | 1/2001 | Bakholdin et al. ............ 310/74 |
| 6,286,849 B1 | 9/2001 | Slattery |
| 6,349,958 B1 | 2/2002 | Gawlik |
| 6,360,838 B1 * | 3/2002 | Kulhavy .................. 180/219 |
| 6,382,338 B1 | 5/2002 | Forbes |
| 6,474,670 B2 | 11/2002 | Shaw |
| 6,527,071 B1 * | 3/2003 | Villedieu ................. 180/8.1 |
| 6,581,494 B2 | 6/2003 | Sechler |
| 6,676,150 B1 | 1/2004 | Goldstein |
| 6,676,476 B1 * | 1/2004 | Lund et al. .................. 446/234 |
| 6,688,630 B1 | 2/2004 | Kayne |
| 6,764,374 B2 * | 7/2004 | Tilbor et al. ................ 446/233 |
| 6,920,953 B2 | 7/2005 | McGovern |

FOREIGN PATENT DOCUMENTS

WO    WO 2005079255 A2 *    9/2005

* cited by examiner

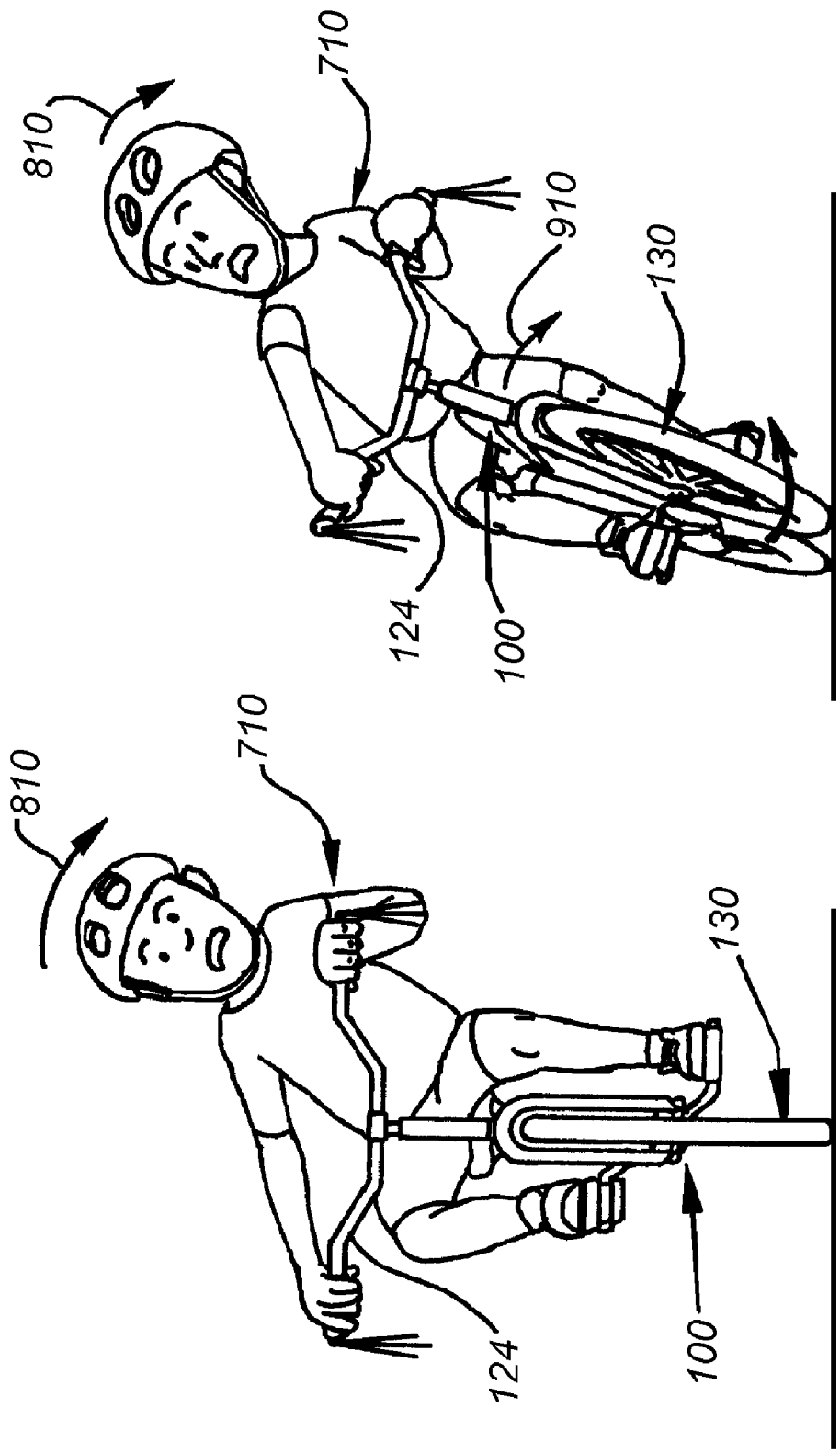

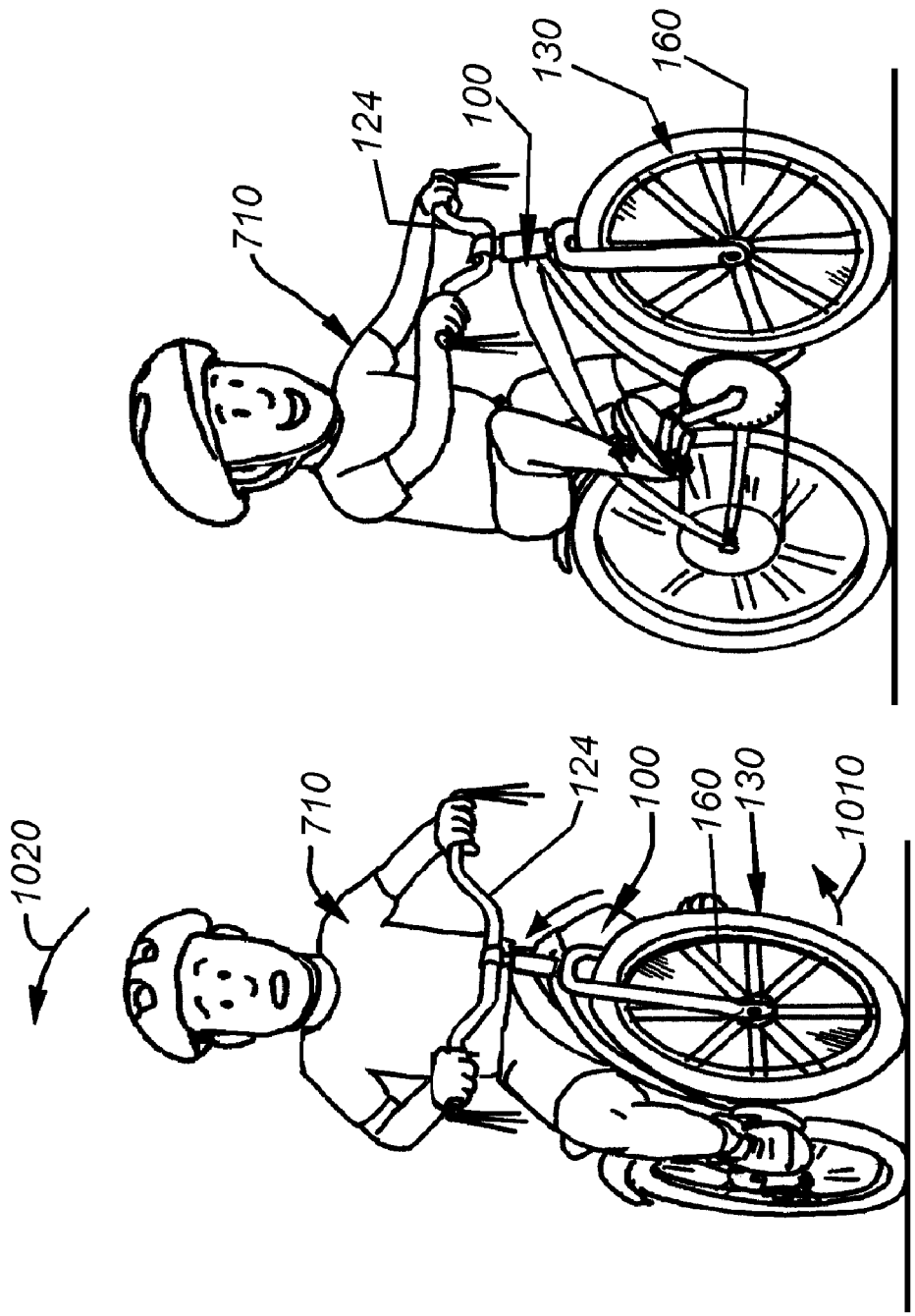

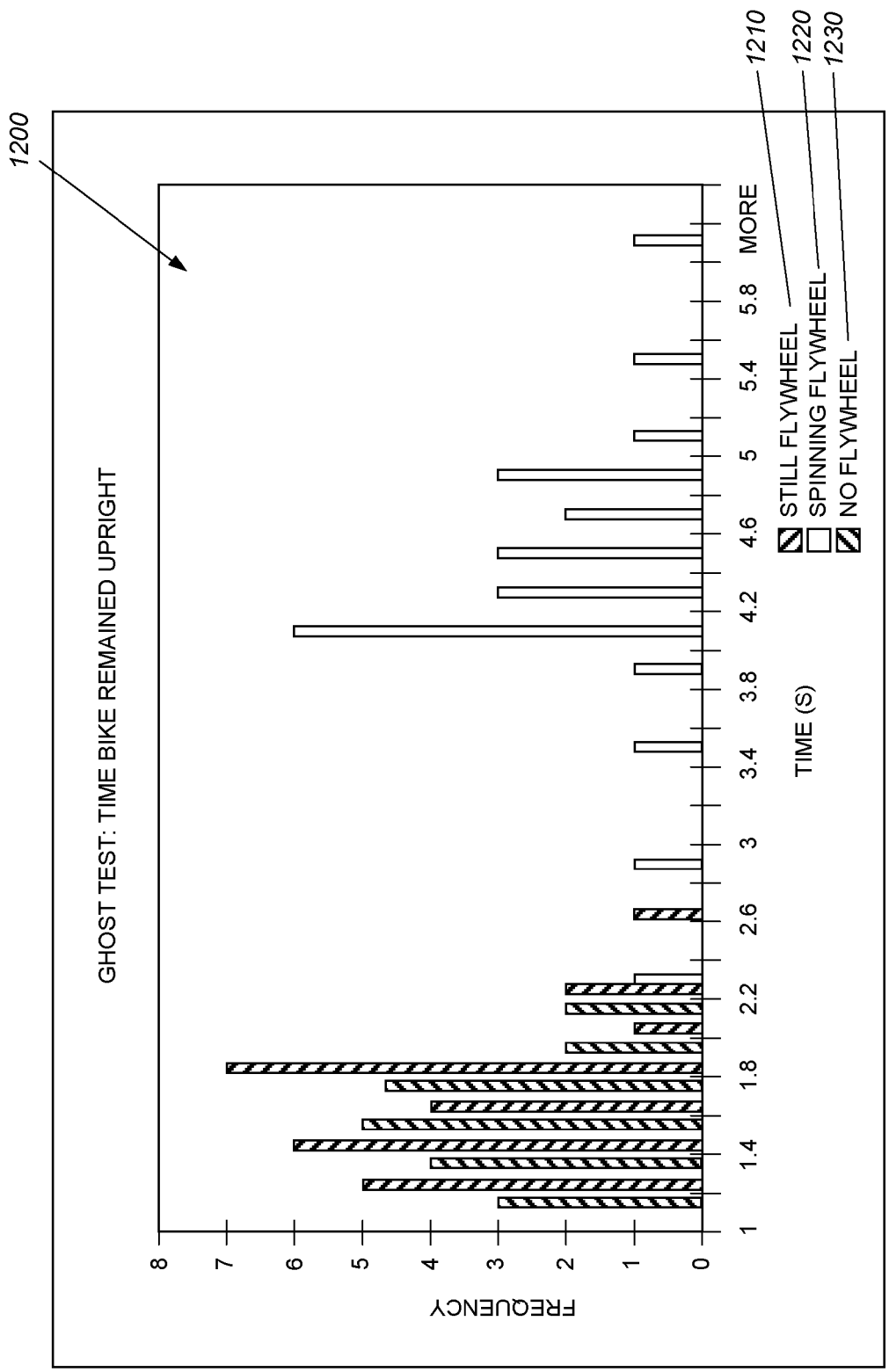

SYSTEM AND METHOD FOR PROVIDING GYROSCOPIC STABILIZATION TO A TWO-WHEELED VEHICLE

RELATED APPLICATIONS

This application is a divisional of Ser. No. 11/170,993, filed Jun. 30, 2005, entitled SYSTEM AND METHOD FOR PROVIDING GYROSCOPIC STABILIZATION TO A TWO-WHEELED VEHICLE, the entire disclosure of which is herein incorporated by reference.

FIELD OF THE INVENTION

This invention relates to stabilization systems for two-wheeled vehicles and training devices for new riders of such vehicles

BACKGROUND OF THE INVENTION

Learning to ride a bicycle, or similar human-powered vehicle, is one of the more difficult physical challenges faced by young children (and some older ones). Children must develop awareness of what are, in essence, complex Newtonian principles of force-balance, gravity, torque, inertia and momentum. Only by continually adjusting weight and balance for the prevailing velocity and turn radius can one proficiently ride a bicycle for any distance. Starting a bicycle from a standing position is a particular challenge as the forward velocity needed to maintain balance has not yet been established. Likewise, turns are difficult for new riders as the weight and balance of the bicycle and rider shifts suddenly and may become difficult to control. It is not uncommon for new riders to jackknife the bicycle wheel, causing both bike and rider to tumble over.

The time-tested approach to preparing children to ride by exposing them to the basic dynamics of a bicycle is the use of training wheels. Briefly, training wheels are typically a pair small-diameter, hard rubber/plastic/wheels attached by removable brackets to the rear axle. When properly installed, the training wheels each extend outwardly (in an axial direction) from a respective axle end several inches, and are mounted so that their lowest points are slightly above the contact point of the rear wheel with the ground. In this manner, the training wheels allow the rider to lean slightly in either direction with one training wheel, or the other, engaging the ground to prevent the bicycle for tipping further.

While training wheels may be good first step for young riders, the traditional ritual of removing them, and allowing the rider to ride therewithout is often fraught with peril and scraped knees. Basically, the rider must now experience a new range of dynamics that were unknown while the training wheels were still attached. Generally, training wheels are inadequate because they do not simulate real, unrestricted bicycle movement. They incorrectly teach riders to balance by relying on the training wheels rather than actually learning to balance through weight manipulation. Moreover, training wheels inhibit rider's from banking as they turn, forcing them into bad habits. They rely on the training wheels, making the transition to autonomous riding extremely difficult.

It is highly desirable to provide a training device that can be used following, or as a substitute to, training wheels that allows new riders to experience the full range of dynamic forces associated with riding while still providing a degree of safety during startup turns and slow riding. In particular, a device that enables children to ride stably at the relatively slow speed of between 2.5 and 5 mph (common for most new riders) while still feeling the stability and behavior of a faster moving bike (e.g. 10 mph+) is highly desirable.

SUMMARY OF THE INVENTION

This invention overcomes the disadvantages of the prior art by providing a stabilizing system and method for two-wheeled vehicles (typically small, human-powered bicycles) that affords the rider no restriction on the full range of movements (banks, leans, etc.) common to bicycles, but that provides greater stability during turns and other maneuvers so that an unintentional bank or tilt (potentially leading to a fall) is less likely, even at relatively slow speeds and startup. A rotating mass of predetermined mass-value and radial mass-distribution is provided (in an illustrative embodiment) coaxially with the front axle. The mass is supported on bearings so as to freewheel with respect to the rotation of the front wheel. As such it can be induced to spin significantly faster than the front wheel thereby generating a gyroscopic effect at the front wheel about the axle. This gyroscopic effect influences the steering of the wheel by the rider. Due to precession, the wheel tends to follow any excessive bank by the bicycle, ensuring that the rider can "steer-out-of" an unintentional tilt. Likewise, the gyroscopic effect limits the rider's ability to execute excessive steering, thereby preventing jackknife movements.

In an illustrative embodiment, mass is mounted on bearings that are themselves mounted over the center hub of the bicycle wheel. The bicycle wheel is, in turn, mounted conventionally on a threaded axle that is attached to the front fork by opposing nuts. The mass of this embodiment is unpowered, and initially forced in to rotation by action of a helper (adult) as the rider starts the ride. It can be urged to rotate using a variety of permanently attached and/or detachable mechanisms. One such mechanism employs a wrapped cord and a reel with a ratchet system that locks the reel in a cord-pulling direction and a spring that rewraps the cord in an opposite, cord-retracting direction. Alternatively, a removable rack and mass-mounted pinion can be used to rotate to mass. In another alternative embodiment, the mass can be rotated using a drill or other cordless/corded electrical device having an elastomeric attachment (or gear) that engages an appropriate drive hub on the mass. The attachment is inserted into contact with the hub for a small duration in which rotational motion is imparted to the drive hub from the electrical device. The device is then removed. The mass may rotate for a minute or more given proper bearings and balance.

In another embodiment, the mass can be permanently and selectively powered using, for example, a motor assembly that is coaxial with the wheel hub. A battery or other power source can be attached to the vehicle to provide continuous power. Such a powered implementation may be particularly suited for and adapted to disabled or older riders who require extra assistance. In addition, in alternate embodiments it is expressly contemplated that the rotating mass (powered or unpowered) can be provided non-coaxially within the structure of the steerable front wheel. Appropriate mountings and/or spaces can be provided to allow the non-coaxial mass to rotate appropriately free of interference from the moving wheel.

BRIEF DESCRIPTION OF THE DRAWINGS

The invention description below refers to the accompanying drawings, of which:

FIG. 8 is a front view of the bicycle and rider of FIG. 7 now in motion, and experiencing an imbalance;

FIG. 9 is a front view of the bicycle and rider of FIG. 7 in which the imbalance of FIG. 8 has induced an unintentional bank or tilt;

FIG. 10 is a front view of the bicycle and rider of FIG. 7 in which the unintentional bank or tilt of FIG. 9 is being compensated by precession of the rotating mass to cause the rider to gently steer into the bank;

FIG. 11 is an on-angle view of the bicycle and rider of FIG. 7 showing the recovery from the imbalance due to the steering of FIG. 10;

FIG. 12 is a graph comparing experimental data of upright travel (without rider) for the same bicycle with no rotating mass, a still mass and a properly rotating mass.

DETAILED DESCRIPTION

Figure 1:
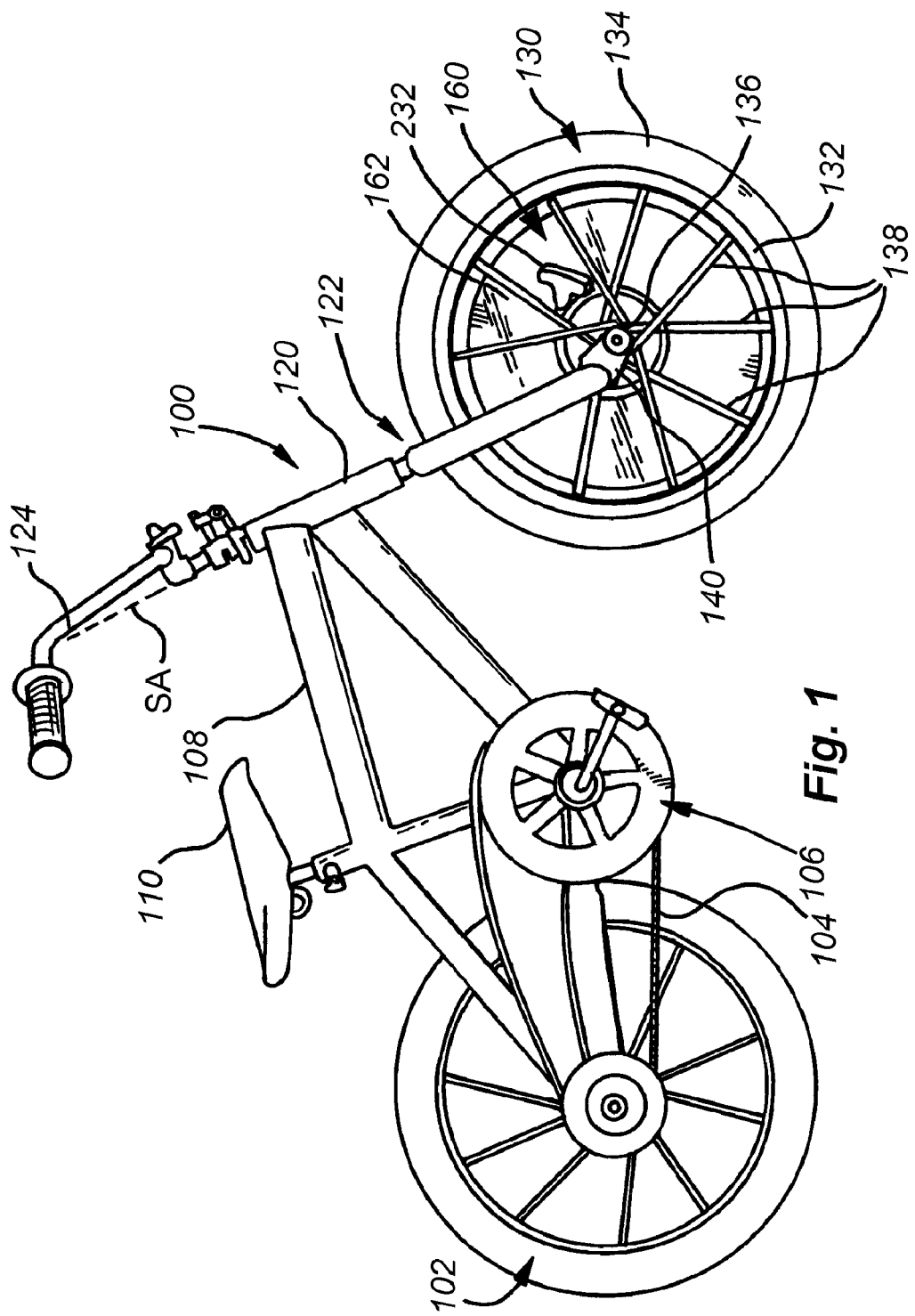
FIG. 1 is a side view of a bicycle equipped with a stabilizing system according to an illustrative embodiment of this invention.

A bicycle 100 having a stabilizing system according to an illustrative embodiment of this invention is shown in FIG. 1. This bicycle is exemplary of a certain size and style of human-powered two-wheeled vehicle that is particularly adapted for smaller children. The terms "bicycle" and "vehicle" as used herein are expressly intended to refer to any type of two-wheeled vehicle (including certain powered vehicles) that would benefit from the front-wheel gyroscopic stabilizing effect to be described herein.

The bicycle 100 includes a conventionally mounted rear wheel assembly 102, driven by a chain 104 that is, in turn operatively connected to a pedal crank assembly 106. The bicycle frame 108 is constructed from a set of joined tubular members that support a seat 110 above the frame 108 and is general alignment with the pedal crank assembly 106 so that a rider (see below) can reach and operate the pedals with his or her feet.

The front of the frame 108 includes a down-tube with internal bearings (not shown) that rotatably supports a front fork assembly 122 operatively connected to handlebars 124 of conventional design. On the lower end of the fork assembly 120, a front wheel 130 assembly is rotatably mounted. In this embodiment, the front wheel assembly 130 includes an outer hub 132 upon which is mounted a tire (and inner tube—not shown) 134. The outer hub 132 is supported radially and axially with respect to an inner hub 136 by a set of spokes 138. The inner hub is attached to the fork assembly's lower fork ends 140 as described further below. The attachment allows the inner hub 136 to rotate freely so that the bicycle can move in forward and reverse motion (forward motion being generally driven by the rear wheel assembly 102). Likewise, the handlebars rotate within a predetermined range (at least) about the steering axis (dashed line SA) to allow the front wheel to turn with respect to the frame.

Figure 2:
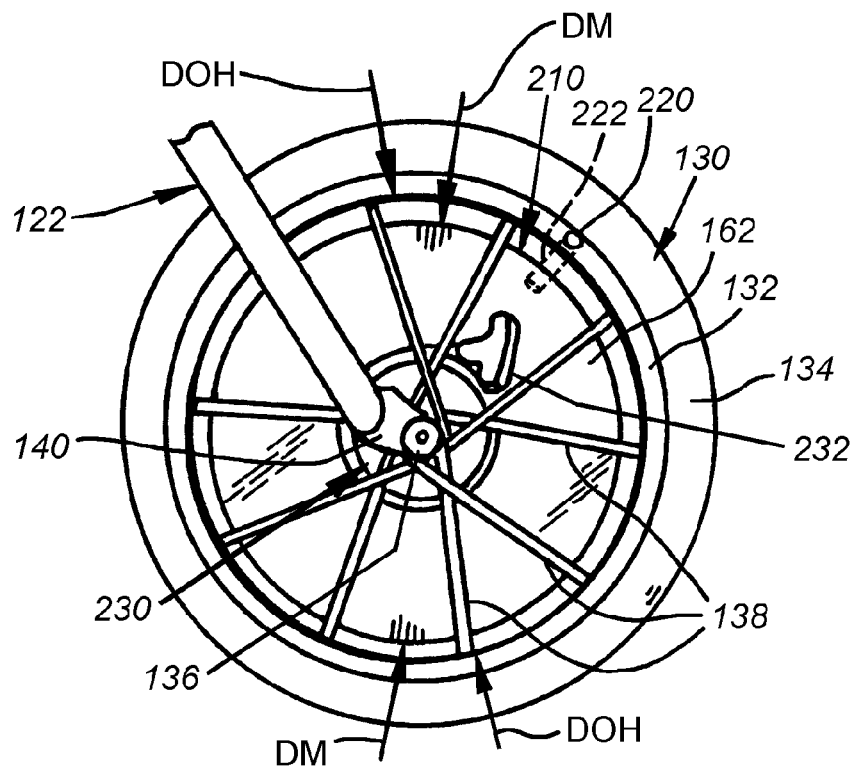
FIG. 2 is a fragmentary side view of a front wheel for the bicycle of FIG. 1 including the stabilizing system having a rotating mass according to one embodiment.

Notably, the front wheel assembly 130 includes a rotating mass or "flywheel" assembly 160 mass according to an embodiment of this invention. With reference also to FIG. 2, the mass 160 is a circular disk 162 having a width (described below) that is nested within and passes freely between spokes 138 on each of opposing sides of the front wheel assembly 130. The outside diameter DM of the mass disk 162 is small than the inner diameter DOH of the outer hub 132. The difference between diameters is sufficient to allow the outside perimeter edge 210 of the disk 162 to clear the convergence of the spokes 138 that join along the narrowed outer hub from each of opposing sides of the wider inner hub 136. In other words, the spokes generally define an equilateral triangle with the apex adjacent to the outer hub and the base at the inner hub. Since the apex region is quite narrow, the radial height of the disk should be short of the apex or any appreciable thickness in the disk will cause it to contact the spokes. However the disk diameter DM can be increased to nearly that (diameter DOH) of the inner hub by making the disk thin, particularly near its outer perimeter 210. Conversely, as will be discussed further below, it is desirable to maintain the concentration of mass in the disk as far from the center (axis of disk rotation) to attain a high I value for the disk without rendering the disk overly heavy.

In order to accommodate a large-diameter disk, the outer hub 132 has been modified to locate the tire fill stem 220 so as to project from the side of the hub 132, rather than the inner circumferential wall (as shown in phantom). Otherwise, the tire stem may contact the disk or simply be rendered difficult to access to fill the tire. A variety of tire stem placements and shape are contemplated and should be within the contemplation of those of ordinary skill whereby interference from the disk can be avoided.

The center of the disk 162 includes a "drive hub" 230 according to an illustrative embodiment. The shape, size and underlying function of the drive hub is highly variable. In this embodiment, the drive hub 230 includes a pull-cord unit that allows the pull-cord to be rapidly paid out by grasping and drawing upon a cord handle 232 that projects from the side of the front wheel assembly. Upon pulling, a ratchet assembly (described further below) engages the disk as causes the disk to spin. The drive hub ratchet works in conjunction with a recoil unit that withdraws the cord after release. The ratchet allows free movement without engaging the disk in the withdrawal direction. It is expressly contemplated that the drive hub can comprise a variety of mechanisms that initiate a high-rpm spin-up of the disk.

Figure 2A:
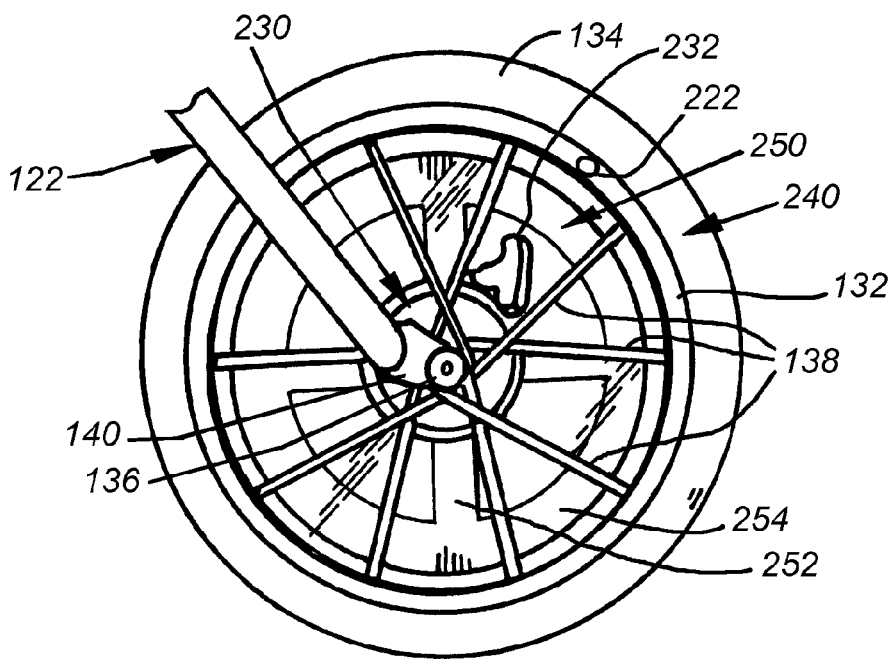
FIG. 2A is a fragmentary side view of a front wheel for the bicycle of FIG. 1 including the stabilizing system having a rotating mass according to another embodiment.

FIG. 2A shows a wheel assembly 240 according to an alternate embodiment. As noted above, it is desirable the mass be concentrated along the outer perimeter of the wheel. Those of ordinary skill will recognize that the value for rotational moment of inertia (I, which equals mass m times the square of the radius, or $I=mr^2$) is optimized where more mass is concentrated at the outer perimeter of a rotating mass. Accordingly, FIG. 20 shows an embodiment of a rotating mass 250 with spokes, rather than a solid structure. The mass is concentrated in the outer perimeter region 254. In this manner overall weight of the disk (and hence the front of the bicycle) is reduced without substantially reducing I. In further embodiments, the mass can be concentrated in the perimeter of a solid disk by providing special weights (lead or steel billets for example) in an otherwise lightened solid disk constructed from, for example, aluminum or composite materials/polymers. Rotating masses need not define a continuous circular perimeter. In alternate embodiments, weight can be distributed in the mass at the ends of a plurality of separated arms, so long as the arms or perimeter structure is well balanced with respect to the central axis so as to avoid up-and-down wobble as the mass rotates within a gravitational field. For the purposes of this illustration, the first mass 162, shown in FIG. 2 can be constructed of steel with a thickness of approximately one inch (highly variable), a diameter DM of 14-15.5 inches (highly variable) and an evenly distributed total mass of approximately 13.5 pounds. The example of FIG. 2A the mass 250 is also constructed of steel with a thickness of about 1 inch. It also has an outer diameter DM of approximately 14-15.5 inches. In one experimental implementation, the total mass for this structure is approximately 12.3 pounds (a savings of more than a pound), and the I value is higher than the evenly distributed disk. By using heavier materials in combination with lighter composites the I-to-weight ratio for the mass can be optimized. In one example, the I value is in a general range of 210-240 pounds* in$^2$, but a wider range of values for moment of inertia are expressly contemplated.

Figure 3:
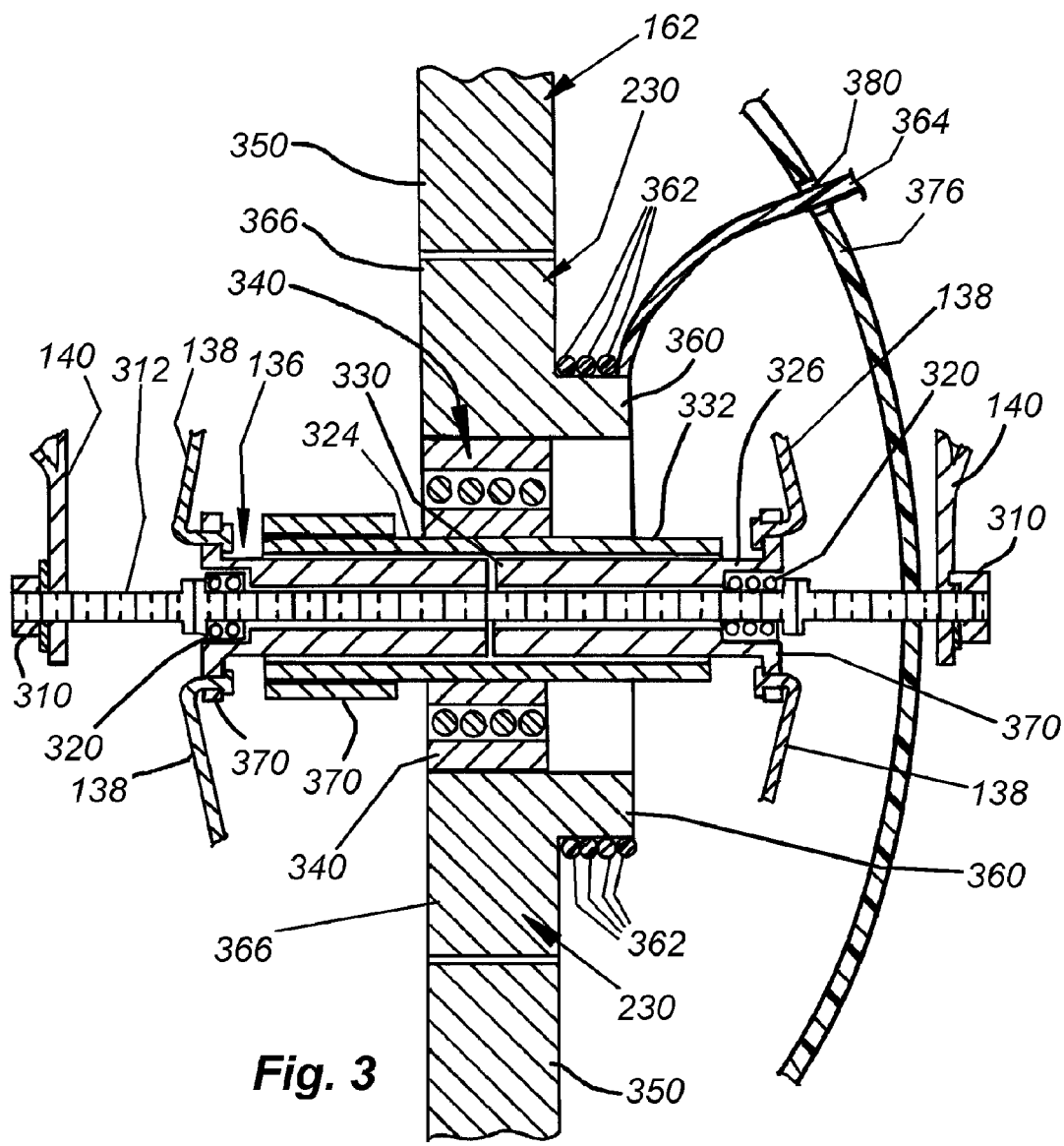
FIG. 3 is a cross section of the wheel and rotating mass according to either FIG. 2 or FIG. 2A.

FIG. 3 shows a cross section of the central region of a wheel assembly and mass 162 according to the embodiment of FIG. 2. The wheel assembly is mounted on the bottom fork ends 140 by a pair of nuts 310, which engage opposing ends of a threaded axle shaft 312. The axle shaft 312 conventionally supports the inner hub 136 on bearings 320. Note that the structure of the shaft 312 and inner hub 136 is highly variable. The main object is to provide a wheel that rotates relative to the front fork and a separate rotating mass that rotates freely with respect to both the wheel and the front fork so that the mass can rotate at a relatively high RPM so as to generate a gyroscopic effect even when the front wheel is barely moving or stationary. To accomplish this free rotation of the moving mass, the inner hub 136 has been divided into two pieces (or a plurality of sections) 324 and 326 with central break 330 therebetween, over which is placed a cylindrical sleeve 332 that forms a new joint between the separated inner hub sections 324, 326. This joint maintains the radial alignment of the sections 324, 326 and forms a bearing surface for the mass. The sleeve 332 can be secured to the outside of the hub sections 324, 326 using (for example) welds, fasteners adhesives or a press fit. The outer surface of the sleeve 332 receives a bearing 340 that is pressed into the mass' drive hub 230. The drive hub can be constructed from any durable metal (aluminum alloy, for example) or polymer/composite material. In this manner, the drive hub 320 rotates freely on is bearing with respect to the sleeve 332, and hence, the front wheel. The drive hub is secured to the radially outward portion 350 of the mass. This interconnection can be by press fit, fasteners, welds, adhesives or any other acceptable technique. Alternatively, the drive hub 230 and outer mass 350 can be formed unitarily from a single piece of formed, cast, molded, and/or machined material (with appropriate fillers, inserts and weights applied to the material where appropriate).

As shown clearly in FIG. 3, the drive hub includes a cylindrical extension 360 of reduced diameter with respect to the main drive hub portion 366 (that engages the outer mass 350). This extension 360 supports a wrapped cord 362 with a tail end 364 that exits the hub and engages the pull handle 232 shown in FIG. 2 above. The firm withdrawal of the cord causes a rapid spin up of the drive hub. A well-balanced mass with a good bearing may spin at high RPM for several minutes. In this embodiment, a spin RPM of approximately 250-400 RPM is sufficient to provide stability as will be described below.

An optional spacer 370 is provided to at least one side of the sleeve 332. This spacer assists in maintaining the drive hub axially centered on the sleeve. Alternate centering and fixing mechanisms are expressly contemplated. In addition, a conical or domed shield 376 is provided between the fork end 140 and spoke flange 370 as shown. While only one side is shown having a shield, this shield can be applied to both sides of the wheel assembly to protect the rider and others from the fast-rotating mass. The shield can be constructed from a durable polymer, such as polycarbonate. It can be transparent/translucent and can include various graphics and visual effects where appropriate. Likewise, the mass can be provided with graphical patterns that, in conjunction with the shield, may be used to create an entertaining effect when in motion. The shield 368 includes a port 380 through which the cord end 364 passes. This allows the user to pull the cord 364 while his or her hands are protected from contact with the mass.

Figure 4:
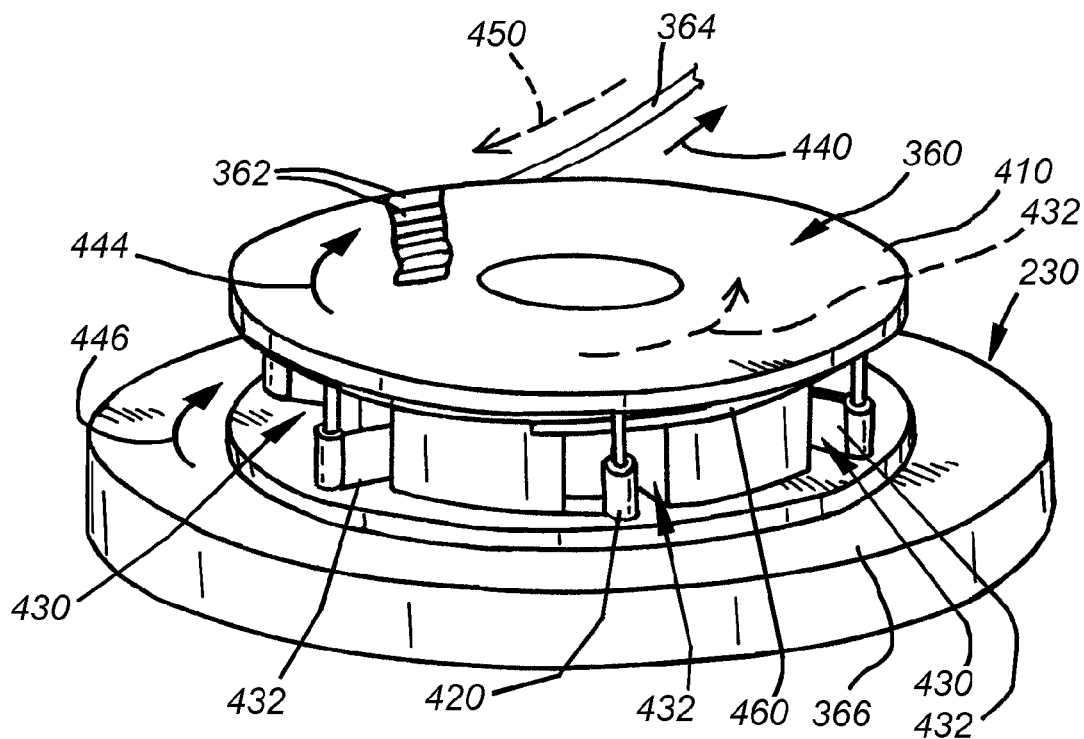
FIG. 4 is a partially exposed perspective view of a cord-pull, recoil-type mechanism for initiating rotation of the mass according to an embodiment of this invention.

With reference now to FIG. 4, a recoiling, cord-pull drive hub assembly 230 according to an illustrative embodiment of this invention is shown in further detail. It should be understood that the structure of this assembly is only exemplary. Those of ordinary skill should be familiar with this type of rotation-inducing mechanism as it is substantially similar to those found in the pull starters of small engines. The drive hub 230 includes the above-described larger-diameter main portion 366 and a smaller diameter projecting cylinder. This cylinder is actually an outer reel that rotates with respect to the main portion and a fixedly attached inner ratchet base 420. The ratchet base includes a series of radial grooves 430 that selectively engage spring loaded pawls attached to the reel 410 when the cord end 364 is pulled outwardly (arrow 440). That is, the pawls 432 lock into the grooves 430 when the cord is pulled, causing the reel to rotate (curved arrow 444) and the main portion 366 to also rotate (curved arrow 446). However, the reel 410 includes a spring assembly 460 that is unwound by the pulling of the cord, and that rewinds to relieve tension, thereby drawing the cord back into a wound position (dashed arrow 450). The pawls 432 disengage for the ratchet bases 430 in this direction reverse to allow rewind to occur (dashed curved arrow 452). Likewise, the disengaged pawls allows the reel to be free from rotation while the mass spins at high speed (thus, no reverse dashed arrow on the main portion 366 is shown).

Figure 5:
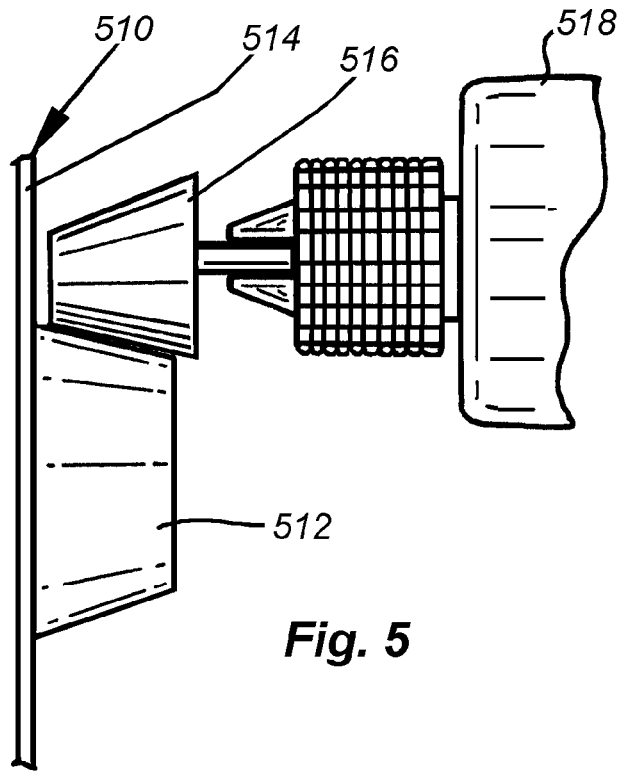
FIG. 5 is a fragmentary side view of an electrical device-driven mechanism for initiating rotation of the mass according to another embodiment of this invention.

As noted above, the spin-up mechanism for the mass is widely variable. One alternate mechanism is shown in FIG. 5. Simply, the drive hub 510 includes an extension 512 from the main portion 514 that is frustoconical in shape. This allows firm engagement with a frustoconical tip 516 of an electrically driven device, such as the illustrated cordless drill 518. The tip can be a hard rubber or other elastomer to firmly engage the extension 512. By simply inserting the drill tip 516 through a hole in the shield (described above), the tip contacts the extension 512 and spins it once power is applied. In practice, the tip 516 can be provided as part of the kit a user receives with the bicycle and/or accessory wheel assembly of this invention.

Figure 5A:
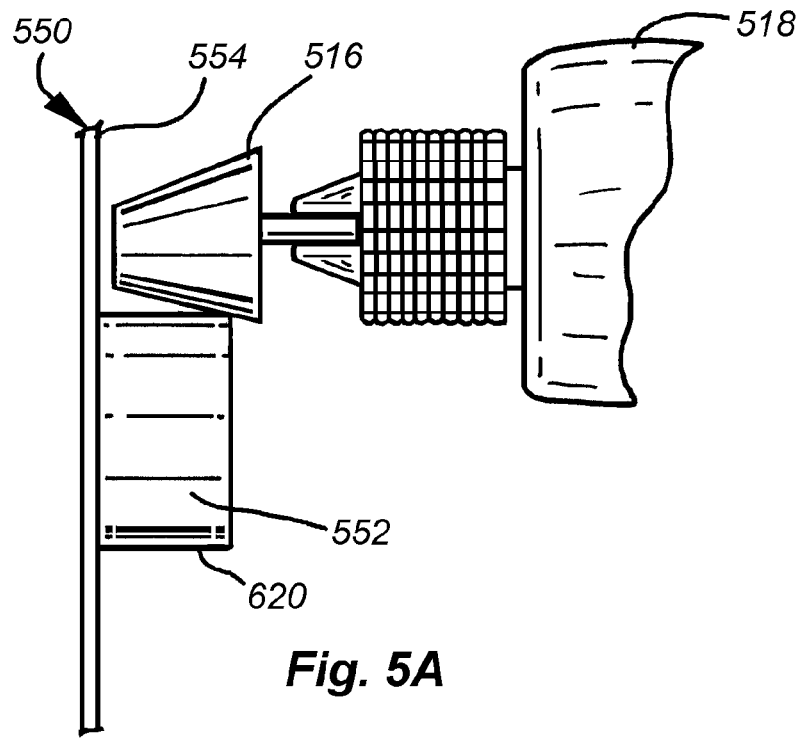
FIG. 5A is a fragmentary side view of the electrical device-driven mechanism of FIG. 5 with an alternative drive hub design according to another embodiment of this invention.

FIG. 5A shows a slightly modified drive hub 550 with a main portion 554, in which the same frustoconical tip 516 (as FIG. 5) drives a straight-cylindrical extension 552. The corner 620 of the cylinder may assist in providing engagement between the tip and extension. A variety of tip shapes, extension shapes, materials and surface textures are expressly contemplated.

Figure 6:
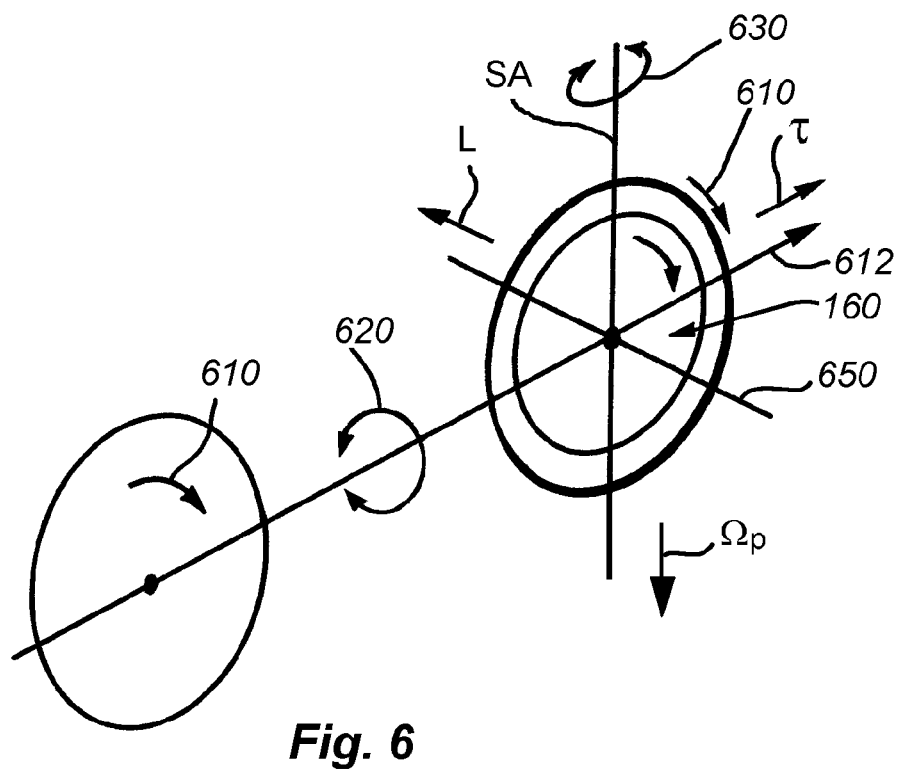
FIG. 6 is a schematic diagram showing the various rotations and axes of interest on a bicycle in connection with this invention.
Figure 7:
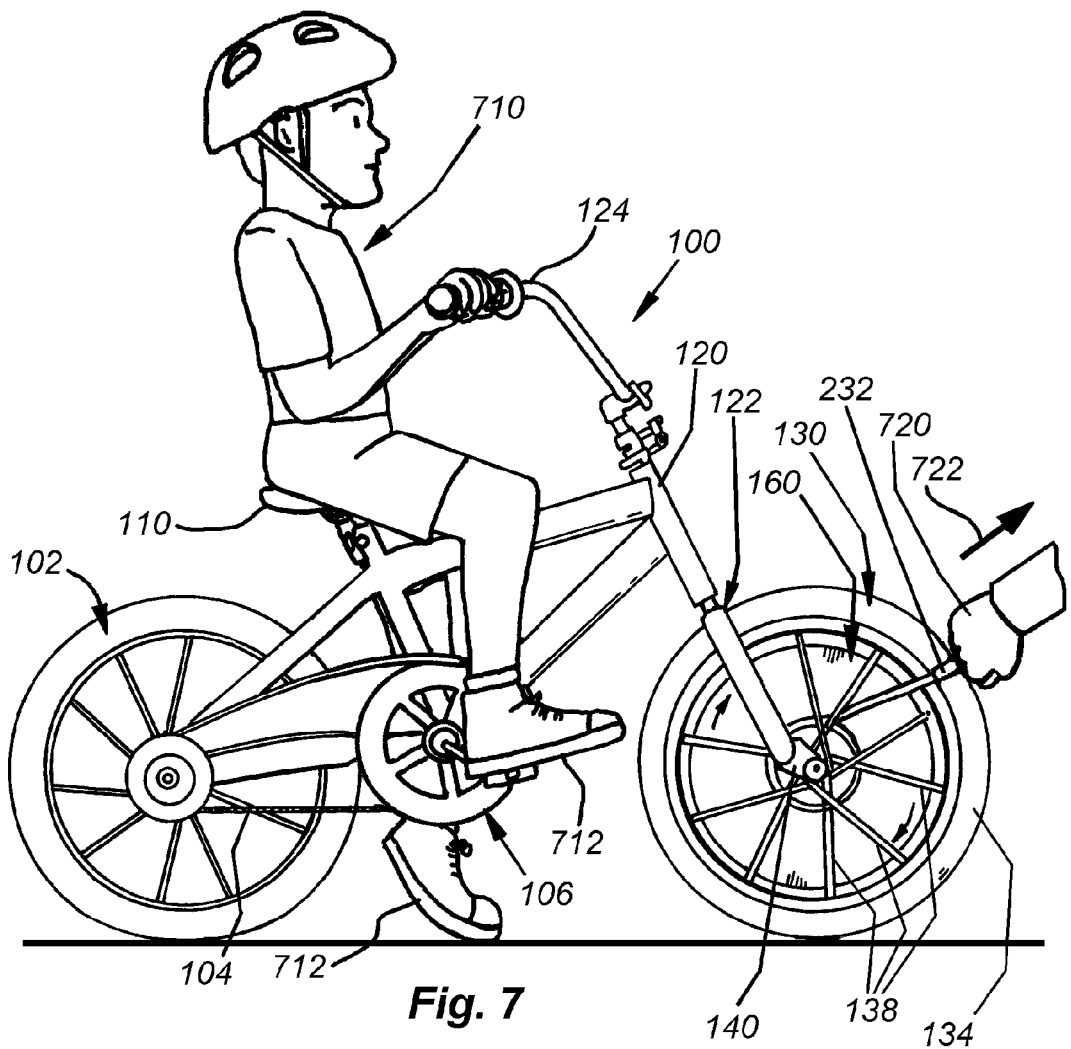
FIG. 7 is a side view of a bicycle and rider in a starting position employing the system and method of this invention.

Having described the structure of an exemplary system for gyroscopically stabilizing a front wheel of a bicycle, the function of the system is now described in further detail. Referring to FIG. 6, the dynamic forces of interest are as follows:

Rotation of the wheels (curved arrows 610) translates into forward velocity along longitudinal axis 612 (when running with a straightened front wheel). Banking generally about the longitudinal axis (actually about wheel-to-ground contact points) is shown as curved arrow 620. The front wheel steers (curved arrow 630) about the above-described steering axis SA.

The mass 160 rotates about the front wheel axis 650, thereby generating a characteristic angular momentum L (where $L=I\omega$, in which $\omega$ is the angular velocity of the rotating mass). The banking rotation represents a torque $\tau$ generally about the longitudinal axis 612. Where angular momentum and torque cross, a precession is generated. This precession is the property whereby a gyroscope rotates at a predetermined magnitude in response to crossed forces. In this case the precession $\Omega_P$ is characterized by the equation:

$$\tau = \Omega_P X L.$$

In other words, the equation governing precession is derived from the fact that torque equals the angular velocity of precession crossed with the angular momentum. Hence, a torque on a gyroscope (such as the torque from a child falling in an excessive or unintentional bank or tilt about the longitudinal axis) is transferred 90 degrees, and results in precession. For example, if the child were to tip to the right, the wheel would simply turn to the right. This allows the weight of the child to be re-centered over the front wheel. It is particularly desired that precession ($\Omega_P$) be small in order so as to produce a relatively smooth recovery for the bicycle wheel. Since precession is inversely proportional to angular momentum a large I value, produces a relatively small precession for a given applied torque.

Reference is now made to the exemplary rider-training session of FIGS. 7-11. The process begins with the rider 710 seated atop the bicycle 100, grasping the handlebars 124 in forward-steering position, with feet 712 prepared to begin pedaling. The helper places a grasping hand 720 on the pull-cord handle 232 and rapidly draws it (arrow 722) to spin the mass 160. After spin-up, the rider 710 begins to pedal.

In FIG. 8, the rider 710 experiences and imbalance (arrow 810) that may lead to an unintentional/undesired bank or tilt. This bank occurs in FIG. 9, in which the bicycle leans (arrow 910) over, threatening to eject the rider 710.

As shown in FIG. 10, due to the precession generated by the spinning mass 160, the front wheel 130 turns smoothly (arrow 1010) in the direction of the unintentional bank, causing the handlebars 124 to be firmly urged to "steer-into" the bank. Thus the rider 710 experiences a turn that causes the bicycle 100 to begin to right itself (arrow 1020). Finally, in FIG. 11, the turn, induced by the imbalance and bank is complete and the rider 710 is riding vertically again in a new direction. The act of banking the bicycle has lead to a conventional turn, without jackknifing the bicycle or causing it to tip over, thus emulating a natural motion of banking and turning, even at relatively low speeds. This allows the young, slowly moving rider to learn the dynamics associated with faster riding, while maintaining a slower, safer speed.

To further prove the effectiveness of the stabilizing system of this invention a series of tests were performed with the approximate results shown in FIG. 12. A bicycle was launched, riderless (e.g. a "ghost" test) along a relatively flat path by hand at a relatively slow speed. Data bars for a non-moving mass (1210) show an upright time duration (before falling over) of approximately 1.2-2.2 seconds. Results are roughly similar for a bicycle with no mass installed (1220). Conversely, a bicycle with a mass moving at 200-400 RPM (1230) shows markedly increased upright time of approximately 2.3-6 seconds, with most times falling into the 4-5 second range (more than double the non-stabilized times).

Figure 13:
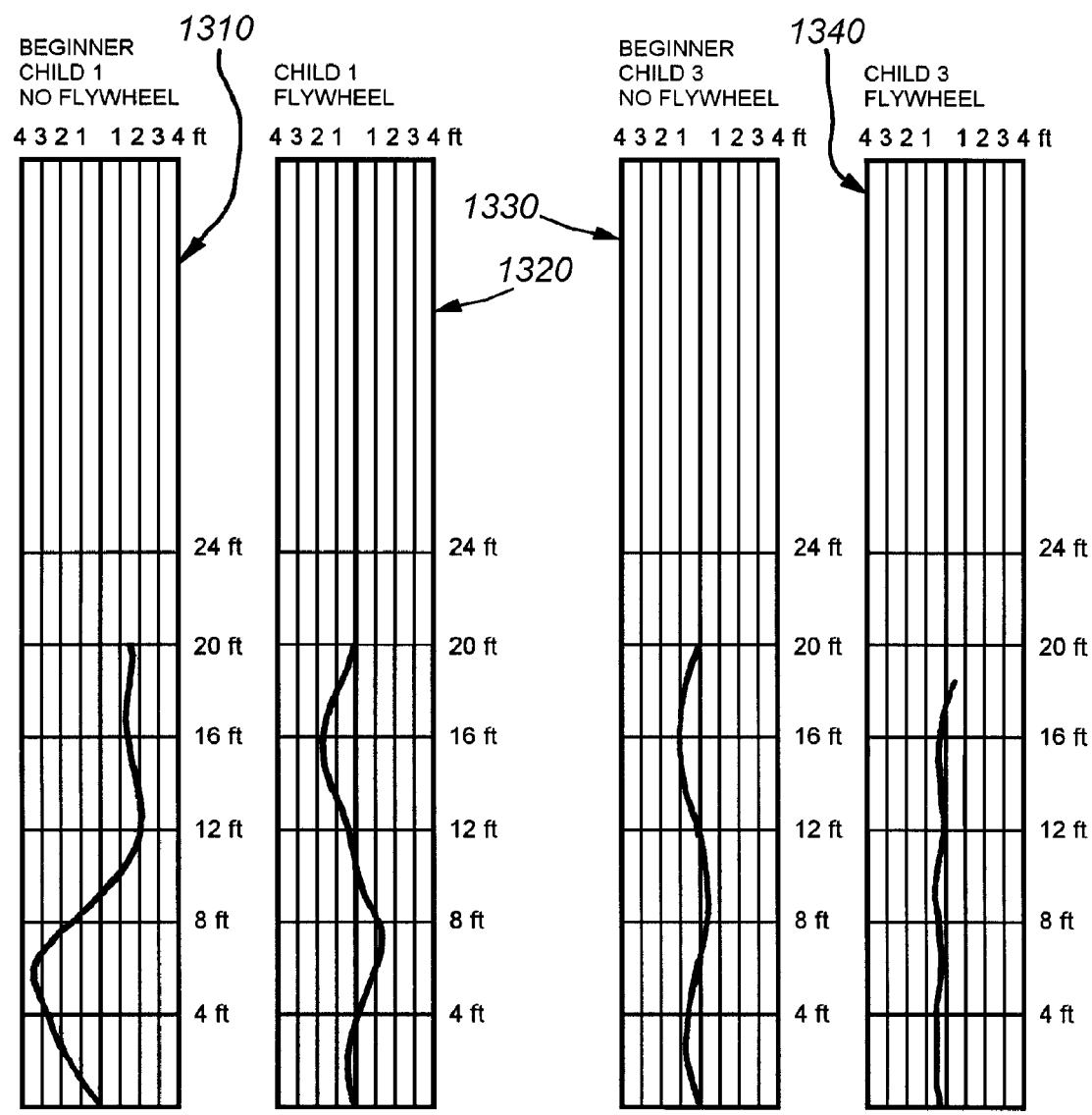
FIG. 13 is a graph comparing experimental data of travel path (with two different riders) for the same bicycle with no rotating mass, and a properly rotating mass.

Similarly, FIG. 13 shows comparative graphs 1310 and 1320, 1330 and 1340 for two respective test subjects, both relatively inexperienced juvenile riders. The graphs show the length of path traveled versus diversion from a straight path (both in feet). In both cases the graph for the bicycle without spinning mass (1310 and 1330) displays a higher amplitude from a straight line than the graphs for the bicycle with properly spinning mass (1320 and 1340).

The foregoing has been a detailed description of illustrative embodiments of the invention. Various modifications and additions can be made without departing from the spirit and scope thereof. By way of example, while a wheel having a plurality of radial thin metal spokes is employed, a variety of wheel and hub structures can be employed. For example, a hub comprising a pair of clamshell halves that is assembled around the disk can be employed in an alternate embodiment, such a hub cab have outer surfaces that act both as a shield for the disk and the radial load-bearing member between the inner and outer hubs. Similarly, solid spokes with appropriate grooves for nesting the disk can be used. A variety of other improvements and modifications to the wheel, disk or drive hub can be implemented within the spirit and scope of this invention. Finally, while the exemplary embodiment described herein has been applied to a bicycle suitable for small children, it is expressly contemplated that this stabilizing system can be applied to the steerable front wheels of a variety of two-wheeled vehicles. In alternate embodiments it can be applied to adult-sized vehicles, and can be continuously powered by electric motor, or the like. This device can alternatively be applied to powered two-wheeled vehicles, such as mopeds, motorcycles and scooters to provide further stability and/or act as a training tool. Such an application can be continuously or momentarily powered as appropriate. In addition, in alternate embodiments it is expressly contemplated that the rotating mass (powered or unpowered) can be provided non-coaxially within the structure of the steerable front wheel. Appropriate mountings and/or spaces can be provided to allow the non-coaxial mass to rotate appropriately free of interference from the moving wheel. Accordingly, this description is meant to be taken only by way of example, and not to otherwise limit the scope of this invention.

What is claimed is:

1. A method for stabilizing a two wheeled vehicle, at least during start of vehicle forward motion comprising the steps of:

initiating rotation of a rotating mass mounted with respect to a steerable front wheel of the vehicle before the start of the forward motion of the vehicle so that the rotating mass is applying gyroscopic force to the front wheel at the start of the vehicle capable of inducing precession during steering of the wheel;

initiating the forward motion of the vehicle using a mechanism that rotates a rear wheel of the vehicle;

responding to crossed forces created by the precession induced in the front wheel by motion so as to reduce unintended tilting of the vehicle;

wherein the step of initiating rotation comprises applying, and then withdrawing a rotation-inducing mechanism to the rotating mass, thereby creating the gyroscopic force that induces precession on the front wheel and that reduces the unintended tilting of the vehicle during steering of the vehicle.

2. The method as set forth in claim 1 wherein the step of initiating rotation comprises providing a mounting coaxial with an axle of the front wheel onto which the rotating mass is mounted that allows the rotating mass to freewheel with respect to the front wheel.

3. The method as set forth in claim 1 wherein the step of initiating further comprises contacting a drive member of the rotating mass with an electrically driven device to rotate the moving mass.

4. The method as set forth in claim 3 wherein the step of initiating comprises rotationally driving a disk that is weighted on an external perimeter thereof and that is mounted on a bearing structure coaxial with an inner hub of the front wheel.

5. The method as set forth in claim 1 wherein the rotating mass is characterized by an I value of between approximately 210 and 240 pounds* in$^2$.

6. The method as set forth in claim 1 wherein the step of initiating includes rotating the rotating mass at initial spin-up at a rotational velocity of between approximately 250-400 RPM.

7. A method for stabilizing a two wheeled vehicle, at least during start of vehicle forward motion comprising the steps of:
   initiating rotation of a rotating mass mounted with respect to a steerable front wheel of the vehicle before the start of the forward motion of the vehicle so that the rotating mass is applying gyroscopic force to the front wheel at the start of the vehicle capable of inducing precession during steering of the wheel;
   while mounted on the vehicle, initiating the forward motion using a mechanism that rotates a rear wheel of the vehicle
   responding to the precession induced in the front wheel by motion so as to reduce unintended tilting of the vehicle; and
   wherein the step of initiating rotation comprises applying to the rotating mass, and then withdrawing from the rotating mass, a rotating, electrically operated mechanism.

8. A method for stabilizing a two wheeled vehicle, at least during start of vehicle forward motion comprising the steps of:
   initiating rotation of a rotating mass mounted with respect to a steerable front wheel of the vehicle before the start of the forward motion of the vehicle so that the rotating mass is applying gyroscopic force to the front wheel at the start of the vehicle capable of inducing precession during steering of the wheel;
   while mounted on the vehicle, initiating the forward motion using a mechanism that rotates a rear wheel of the vehicle
   responding to the precession induced in the front wheel by motion so as to reduce unintended tilting of the vehicle; and
   wherein the step of initiating includes rotating a drive hub interconnected with the rotating mass by pulling a pull cord that spins the drive hub.

9. The method as set forth in claim 8 further comprising having the pull cord rewound to the drive hub by action of a recoil winding reel.

\* \* \* \* \*